United States Patent [19]

Holt et al.

[11] Patent Number: 4,639,432

[45] Date of Patent: Jan. 27, 1987

[54] OXIDATION CATALYSTS

[75] Inventors: Andrew Holt, Enfield; Martin G. Cheek, Cheshunt; Ernest N. Clegg, Ware, all of England

[73] Assignee: UOP Limited, Middlesex, England

[21] Appl. No.: 543,001

[22] Filed: Oct. 18, 1983

[30] Foreign Application Priority Data

Oct. 18, 1982 [GB] United Kingdom ................ 8229655

[51] Int. Cl.$^4$ ........................ B01J 23/10; B01J 23/64; B01J 23/66; B01J 23/89
[52] U.S. Cl. ..................................... 502/324; 502/302; 502/303; 502/304; 502/326; 502/330; 502/331; 423/213.5
[58] Field of Search ............... 502/303, 324, 326, 304, 502/330, 331, 302; 423/213.5

[56] References Cited

U.S. PATENT DOCUMENTS

| | | | |
|---|---|---|---|
| 3,929,965 | 12/1975 | Kim et al. | 423/213.5 |
| 4,006,103 | 2/1977 | Meguerian et al. | 423/213.5 |
| 4,128,503 | 12/1978 | Yamauchi et al. | 502/213 |
| 4,162,235 | 7/1979 | Acres et al. | 502/303 X |
| 4,171,288 | 10/1979 | Keith et al. | 502/304 |
| 4,378,307 | 3/1983 | Brunelle et al. | 502/232 |

*Primary Examiner*—W. J. Shine

[57] ABSTRACT

Catalysts adapted to catalyse the oxidation of carbon monoxide to carbon dioxide comprise palladium, one or more of the metals platinum, ruthenium, rhodium and iridium and one or more of the metals copper, nickel, cobalt, iron, manganese, silver, lanthanum, cerium, praseodymium and neodymium on substantially chloride-free stannic oxide supports.

7 Claims, No Drawings

OXIDATION CATALYSTS

This invention relates to oxidation catalysts adapted to catalyse the combination of carbon monoxide and oxygen to form carbon dioxide. The invention is particularly, but not exclusively, concerned with such catalysts which will operate at ambient or sub-ambient temperatures.

Oxidation catalysts of the type just referred to which will operate at ambient or sub-ambient temperatures, may be used to effect the combination of carbon monoxide and oxygen in carbon dioxide gas lasers, in certain confined spaces where carbon monoxide may be generated and where, for long periods, it is not possible to ventilate these spaces, as, for example, in nuclear submarines, in ventilation systems operating near welding equipment and in cigarettes in order to render harmless the carbon monoxide produced by the burning of the tobacco. Oxidation catalysts of the type previously referred to which will operate at higher temperatures may be used for the oxidation of carbon monoxide in the exhaust gases from petrol- or diesel-driven internal combustion engines.

In a carbon dioxide gas laser, laser emission is initiated by an electrical discharge within a gas tight envelope containing, typically, a mixture of carbon dioxide, nitrogen and helium in the proportions by volume of 2:1:2. The electrical discharge in the gas also, unfortunately, causes some of the carbon dioxide to be dissociated into carbon monoxide and oxygen and, unless the dissociation products are removed, there is a loss of output from the laser due, for example, to arcing between the electrodes which are used to set up the electrical discharge in the gas. In transversely excited lasers (that is, where the electrodes are so disposed as to cause excitation transverse of the laser axis) including TEA (transversely excited atmospheric pressure) lasers, the dissociation products carbon monoxide and oxygen, tend to cause the electrical discharge to split up into localised arcs, again with a very significant loss of output. In both cases, this degradation of the discharge can ultimately lead to the failure of the device unless steps are taken to remove the dissociation products which are the cause of the degradation.

In the so-called "flowing gas" type of laser, these dissociation products are swept bodily away and replaced by carbon dioxide, but in sealed carbon dioxide lasers, steps must be taken either to prevent the dissociation of the carbon dioxide in the first place or else to effect the recombination of the carbon monoxide and oxygen virtually as or very shortly after they are produced, if such lasers are to operate at or close to peak efficiency.

An electrically heated platinum wire has already been used with some success in order to effect the catalytic re-combination of the carbon monoxide and oxygen in a carbon dioxide laser. This method has the disadvantage, however, that the wire has to be heated to about 1000° C. to be effective so that, in consequence, there is an increase in the power consumption of the laser. This is very undesirable, especially in portable laser equipment and the heat generated may, in some cases, lead to the distortion of the laser envelope.

It has also been proposed to effect the combination of carbon monoxide and oxygen in a laser by means of stannic oxide-supported palladium or platinum catalysts which may be contained in porous structures of alumina or silica.

Yet again, but this time in another field, it has been proposed to oxidise carbon monoxide, especially in motor car exhaust systems, by means of a catalyst comprising stannic oxide and at least one of the metals platinum, palladium, rhodium, iridium and ruthenium. Such a catalyst may also contain silica and, additionally, ceramic fibres.

We have now found that the activity in promoting the combination of carbon monoxide and oxygen of certain prior art stannic oxide-supported platinum group metal catalysts of the type just referred to is very significantly enhanced, and the proneness of these catalysts to deactivation in service, very considerably reduced by the addition of one or more of the metals copper, nickel, cobalt, iron, manganese, silver, lanthanum, cerium, praseodymium and neodymium and also by the use of substantially chloride-free materials in the preparation of the catalysts.

According to the present invention, therefore, catalysts adapted to catalyse the oxidation in the presence of oxygen of carbon monoxide to carbon dioxide comprise stannic oxide, palladium, one or more of the metals platinum, ruthenium, rhodium and iridium and one or more of the metals copper, nickel, cobalt, iron, manganese, silver, lanthanum, cerium, praseodymium and neodymium.

The materials from which these catalysts are made are preferably substantially chloride-free.

Further, the stannic oxide may be in the form of powder or granules or of self-supporting bodies formed from the powder or granules.

Catalysts according to the invention may comprise 0.5–5 wt % palladium, 0.5–5 wt % platinum and 0.1–25 wt % of either nickel or manganese deposited on powdered stannic oxide as such or on stannic oxide granules or on powdered stannic oxide formed into self-supporting bodies such as right circular cylinders.

Preferred catalysts according to the invention comprise 0.5–2.5 wt % platinum, 0.5–2.5 wt % palladium and 0.1–5 wt % of either nickel or manganese deposited on and within self-supporting right circular cylindrical bodies made from stannic oxide. The amount of nickel or manganese used in catalysts according to the invention may be within the range 0.25–0.75, and 0.1–0.5 wt %, respectively.

A preferred way of preparing catalysts according to the invention and the activity tests that were carried out on catalysts prepared in this way will now be described by way of example only.

The catalysts included a nominal 2 wt % each of palladium and platinum and a nominal 0.5 wt % of nickel deposited on and within right circular cylindrical bodies of stannic oxide approximately 2 mm in diameter by 8 mm in length. These stannic oxide cylinders were first formed in the following way:

Commercially available, substantially chloride-free hydrated stannic oxide [$SnO_2 \cdot xH_2O$] was mixed with sufficient 20 vol % nitric acid in a mixer to produce a material with a dough-like consistency. This was then extracted through an array of 2 mm diameter apertures in a vertical stainless steel plate and the cylindrical extrudate from each hole cut off when it had reached a length of about 8 mm. The resulting extrudates were collected and then dried in air for 18 hours at 40° C. Following this the temperature of the extrudates was raised to 300° C. over a period of 2 hours at a substantially uniform rate and then held at this value for 6 hours so as to calcine the extrudates in air.

The resulting calcined extrudates were next impregnated with 0.5 wt % nickel by treatment with an aqueous solution of nickel nitrate hexahydrate [$Ni(NO_3)_26H_2O$] in a rotary evaporator. The thus impregnated extrudates were then dried in air for 4 hours at 100° C., following which their temperature was raised to 300° C. over a period of 2 hours at a substantially uniform rate and then held at this value for a further 8 hours, so as to calcine the extrudates in air.

Next, the resulting calcined, nickel-containing extrudates were subjected to additional impregnation, drying and heating steps as just described except that the extrudates were now impregnated with about 2 wt % each of platinum and palladium using aqueous solutions of tetrammine platinous hydroxide ($Pt(NH_3)_4(OH)_2$) and tetrammine palladous nitrate ($Pd(NH_3)_4(NO_3)_2$).

At this stage, the nickel, palladium and platinum impregnated extrudates were in the oxidised state and they were then reduced. This was done by immersion of the pellets in a 10 vol % solution by hydrazine hydrate ($NH_2NH_2H_2O$), leaving them immersed in the solution for 20–30 minutes and then oven drying them for 1 hour at 70° C. In this way, active catalyst extrudates or pellets containing metallic palladium, platinum and nickel were produced. If desired, the active metals nickel, palladium and platinum may be reduced using hydrogen.

An alternative way of carrying out the preparation of the nickel-, palladium- and platinum-impregnated extrudates just described is to add the nickel nitrate hexahydrate to the 20 vol % nitric acid prior to adding this to and mixing it with the hydrated stannic oxide. The action of the mixer produces an homogeneous dispersion of the nickel nitrate throughout the hydrated stannic oxide upon the addition of the nitric acid. The resulting mix is then extruded, dried and calcined as before and the calcined, nickel-containing extrudates are finally impregnated with platinum and palladium, dried, calcined and reduced, again as before.

In both the original and alternative methods of preparation just described, substantially chloride-free platinum and palladium salts other than tetrammine platinous hydroxide and tetrammine palladous nitrate may be used as well as methods of reduction other than treatment with hydrazine hydrate. Reduction of the active metals may, as indicated previously, be achieved using hydrogen.

Returning now to the active catalyst pellets produced in the manner previously described, the activity of these pellets was next tested by placing a known weight of the pellets on a sintered glass disc in a vertical glass reactor tube about 30 cm high and 5 cm in diameter and then passing a test gas consisting of 1% oxygen, 2% carbon monoxide, 40% nitrogen and 57% carbon dioxide upwards through the sintered disc and the pellets. The oxygen level in the emerging gas was monitored by means of a paramagnetic oxygen analyser and the rate of oxygen removal from the gas was found to be typically $8.1 \times 10^{-7}$ mol sec$^{-1}$ g$^{-1}$ of catalyst at 20° C. This figure is a measure of activity of the catalyst in promoting the oxidation of carbon monoxide to carbon dioxide. When these tests were repeated on stannic oxide-supported palladium/platinum catalysts containing about 2 wt % of each of these metals, typical rates of oxygen removal of only $1.9 \times 10^{-7}$ mol sec$^{-1}$ g$^{-1}$ of catalyst at 20° C. were obtained.

The preparative method and tests described in the foregoing were repeated using, separately, in place of a solution of nickel nitrate, solutions of cupric nitrate trihydrate, manganous nitrate, silver nitrate and lanthanum nitrate hexahydrate, the quantities in each case being such as to deposit 0.5 wt % of the metal concerned on and in the pellets. Test results obtained with cupric nitrate, trihydrate, silver nitrate and lanthanum nitrate hexahydrate were comparable with, but not quite as good as, those obtained in the first series of tests with the nickel/palladium/platinum material.

On the other hand, test results obtained using catalysts produced by replacing the solution of nickel nitrate by manganous nitrate showed higher activity with respect to oxidation of carbon monoxide to carbon dioxide. The tests carried out using manganese containing catalysts were similar to those previously described with respect to the nickel containing catalysts and the catalysts were of the following compositions: Catalyst 1: 96 wt % stannic oxide, 0.5 wt % manganese, 2.0 wt % palladium and 1.5 wt % platinum. Catalyst 2: 96.3 wt % stannic oxide, 0.5 wt % manganese, 2.0 wt % palladium and 1.2 wt % platinum.

5 grams of catalyst 1 were used with a laser gas of 0.5% oxygen, 1% carbon monoxide, 70% nitrogen and 28.5% carbon dioxide. The laser gas was flowed over the catalyst at a rate of 1 liter per minute at a temperature of 20° C. and a carbon monoxide conversion rate of about $1.48 \times 10^{-6}$ mol sec$^{-1}$ gram$^{-1}$ was obtained.

A carbon monoxide conversion rate of about $1.48 \times 10^{-6}$ mol sec$^{-1}$ gram$^{-1}$ was obtained when the same laser gas was flowed at the same rate and at the same temperature over catalyst 2.

A further laser test undertaken using the same laser gas with a sealed-off recirculating gas flow over catalyst 2 and at a laser ambient temperature of $-40°$ C. showed that catalytic activity was maintained at a rate sufficient to maintain laser output power.

Finally, tests were carried out on sample catalysts comprising nickel, palladium and platinum supported on stannic oxide prepared by the thermal dehydration of orthostannic acid which had in turn been precipitated from a stannic chloride solution by treating this solution with ammonia, and the rates of oxygen removal observed were very substantially lower than those obtained with catalysts supporting on stannic oxide prepared from substantially chloride free hydrated stannic oxide as previously described. It was this work which made it plain to us that the presence of the chloride ion has a deleterious effect on the activity of the catalyst.

Catalysts according to the invention in the form of extruded pellets made as previously described have been found to be eminently suitable for promoting the recombination of carbon monoxide and oxygen in carbon dioxide gas lasers. Further, not only is their activity in this application very significantly greater than that of known stannic oxide-supported palladium/platinum catalysts, their rates of deactivation in service are sufficiently low for their effective lifetimes to be at least an order of magnitude greater than those of the known catalysts just referred to.

In applications of the type just described, we have found it desirable to mount the pellets in such a way as to minimise attrition losses. Two ways of doing this that we have found successful are to secure the pellets to, for example, suitably sized aluminium plates by epoxy resin, or to insert the pellets into suitably sized holes in such plates.

Although the invention has been described with reference to the oxidation of carbon monoxide to carbon dioxide gas under conditions comparable to those which obtain in a carbon dioxide gas laser, it will be appreciated that catalysts according to the invention may be used in many other applications, apart from those referred to at the beginning of this specification, where it is required to oxidise carbon monoxide gas in the presence of oxygen to carbon dioxide gas.

We claim:

1. A catalyst for catalyzing the oxidation, in the presence of oxygen, of carbon monoxide to carbon dioxide, said catalyst being substantially chloride-free and consisting essentially of stannic oxide supporting a mixture of (i) palladium, (ii) at least one member of the group consisting of platinum, ruthenium, rhodium and iridium and (iii) at least one metal selected from the group consisting of copper, nickel, cobalt, iron, manganese, silver, lanthanum, cerium, praseodymium and neodymium, said catalyst being suitable for use at ambient or sub-ambient temperature and being characterized by enhanced activity for said oxidation and reduced proneness to deactivation in service by the incorporation therein of (ii) and (iii).

2. A catalyst according to claim 1 consisting essentially of 0.5-5 wt. percent palladium, 0.5-5 wt. percent platinum and 0.1-25 wt. percent of either nickel or manganese supported on a carrier of stannic oxide.

3. A catalyst according to claim 2 consisting essentially of 0.5-2.5 wt. percent platinum, 0.5-2.5 wt. percent palladium and 0.1-5 wt. percent of either nickel or manganese supported on a carrier of stannic oxide.

4. A catalyst according to claim 2 wherein the carrier of stannic oxide is in the form of powder, granules or self-supporting bodies formed from the said powder or the said granules.

5. A catalyst according to claim 2 consisting essentially of 2 wt. percent palladium, 2 wt. percent platinum and 0.5 wt. percent nickel deposited on and within self-supporting bodies of stannic oxide.

6. A catalyst according to claim 1 consisting essentially of 96 wt. percent stannic oxide as the carrier, 0.5 wt. percent manganese, 2.0 wt. percent palladium and 1.5 wt. percent platinum.

7. A catalyst according to claim 1 consisting essentially of 96.3 wt. percent stannic oxide as the carrier, 0.5 wt. percent manganese, 2.0 wt. percent palladium and 1.2 wt. percent platinum.

* * * * *